United States Patent [19]
Martinez et al.

[11] Patent Number: 6,126,072
[45] Date of Patent: *Oct. 3, 2000

[54] CHECK PROCESSING MICR PRINTER AND ENCODER

[75] Inventors: Phillip M. Martinez, Groton; Scott J. Longrod, Lansing, both of N.Y.

[73] Assignee: Axiohm Transaction Solutions, Inc., Ithaca, N.Y.

[*] Notice: This patent is subject to a terminal disclaimer.

[21] Appl. No.: 09/130,700

[22] Filed: Aug. 7, 1998

[51] Int. Cl.[7] ........................................ G06K 7/00

[52] U.S. Cl. .......................................... 235/439; 235/449

[58] Field of Search ..................... 235/449, 439, 235/486, 493; 364/705.02; 271/902; 400/73

[56] References Cited

U.S. PATENT DOCUMENTS

| | | | |
|---|---|---|---|
| 5,934,193 | 8/1999 | Menzenski | 101/287 |
| 5,965,862 | 10/1999 | Momose | 235/449 |

*Primary Examiner*—Karl D Frech
*Attorney, Agent, or Firm*—Salzman & Levy

[57] ABSTRACT

In an MICR encoder of a point-of-sale transaction printer, the MICR characters must be printed at a precise distance to the right edge of the check in order to place the MICR in the proper field site. In order to accomplish this, an optical sensor is provided in a check processing mechanism of a point-of-sale printer, to detect the edge of the check and stage it at a known location from a thermal, MICR printhead. It then becomes an easy matter to advance the check by a stepper, drive and print motor a fixed number of step increments in order to start the printing sequence.

8 Claims, 3 Drawing Sheets

CHECK PROCESSING MICR PRINTER AND ENCODER

FIELD OF THE INVENTION

The present invention relates to a point-of-sale transaction printer and, more particularly, to a point-of-sale transaction printer having check processing capability including a sensor for accurately locating the edge of the check so that the MICR characters can be properly encoded within the assigned check field.

BACKGROUND OF THE INVENTION

In present day point-of-sale (POS) transactions involving payment by check, the MICR indicia that are to appear on the check of a customer are added after the sale, and at a remote location, i.e., either at the bank, or in a separate (back room) at the retail site.

For the first time, this invention seeks to eliminate the role of the bank in supplying the required MICR indicia on a check presented for POS payment at a retail establishment. Owing to its new function, machines now being designed by the present assignee of this invention, must be able to encode and read MICR located in one or more specific fields of the check.

In a MICR encoder of the new machine, the MICR characters must be printed at a precise distance to the right edge of the check in order to place the MICR in the proper field site in accordance with strict ANSI and/or ISO specifications. In order to accomplish this, an optical sensor is provided to detect the edge of the check and stage it at a known location from the thermal, MICR printhead. It then becomes an easy matter to advance the check a predetermined distance by a stepper motor drive in a fixed number of step increments in order to start the printing sequence.

SUMMARY OF THE INVENTION

In accordance with the present invention, there is provided a point-of-sale transaction printer including means for encoding and subsequently reading MICR indicia upon a check presented for payment at a point-of-sale. The machine comprises a presenting zone, where the check is presented to the machine with a specific facial orientation. The check is fed into the machine by a pair of drive rollers. The check passes an encoding MICR readhead and printer zone. A reflective optical sensor stages the check for various positions with respect to MICR printing and reading. The leading edge of the check is sensed by the optical sensor. The sensor generates a signal in response to the sensing of the leading edge. This signal is sent to the drive rollers, commanding them to stop feeding the check. The check is now positioned for printing (encoding) the MICR characters in the amount field of the check. After the MICR indicia has been printed, the drive rollers clamp and grip the check, and the check is driven past an MICR read head of the printer. The edge of the check is again sensed by the optical sensor, which sends a signal to stop the drive rollers. The MICR indicia are then read by the read head. After reading and verifying the MICR characters, the check is driven out of the check processing machine, and presented to the operator. The drive rollers are then opened to allow the operator to remove the check.

It is an object of this invention to provide a way of accurately and precisely encoding and verifying MICR indicia in the amount field of a check at a point-of-sale; and It is another object of the invention to provide a means to sense the position of a check presented to a check processing machine, so that MICR indicia can be accurately placed in the amount field of the check.

BRIEF DESCRIPTION OF THE DRAWINGS

A complete understanding of the present invention may be obtained by reference to the accompanying drawings, when considered in conjunction with the subsequent detailed description, in which.

For purposes of clarity and brevity, like elements and components will bear the same designation and numbering throughout the figures.

DESCRIPTION OF THE PREFERRED EMBODIMENT

Generally speaking, the invention features a transaction printer that encodes and reads MICR indicia at a point-of-sale. A sensor is provided in the MICR encoding portion of the printer to detect the edge of the check and allow precise registration of the edge for subsequent printing of the MICR characters. The sensor also provides check location information to the printer control electronics for various other operations required in the encode print sequence or other printer functions.

Figure 1:
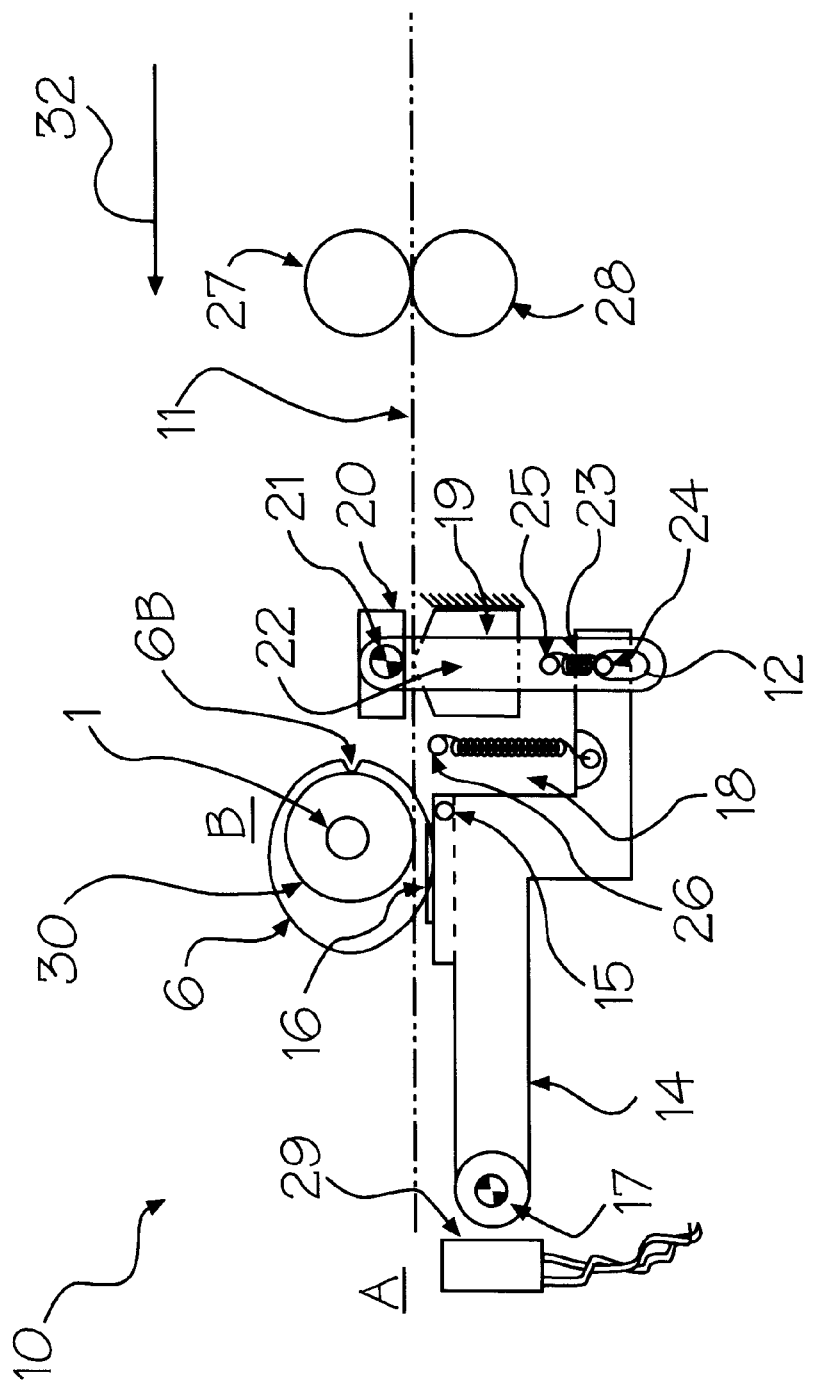
FIG. 1 illustrates a schematic view of a check processing apparatus in a first check handling position corresponding to the insertion of a check.

Referring to FIG. 1, a check processing apparatus 10 is shown. A check (not shown) is inserted into the check processing apparatus 10 at point A with a face down orientation. The check is fed into the apparatus 10, along the check feed path 11. The apparatus 10 is designed to encode the check with MICR indicia at the point-of-sale. To provide the MICR characters a MICR encoder printhead 16, and a MICR verifying reader 19, are disposed along feed path 11.

A pressure pad 20 is located above the MICR read head 19. This pressure pad presses the check, or other printed media, against the read head 19 to ensure good contact. A link 22 is connected to the pressure pad 20 through a pivot pin 21. A slot 12 at the distal end of the link 22, causes the link to be guided by link pin 24, which is fixedly attached to the end of the printhead arm 14. The printhead arm 14 is biased upwardly (arrow 33, FIG. 2) via spring 18 that is anchored to the housing pin 26. The pin 24 which rides in slot 12, is biased against the upper end of slot 12 by the tension spring 23 that is attached at its other end to pin 25. The spring 23 provides the contact force for pressure pad 20, as pin 24 moves away from pin 25 guided by the slot in link 22. The check, or other media, is driven by feed rollers 27 and 28, which are part of the Point-of-Sale printer (not shown), which is positioned to the rear of the check processing apparatus 10.

A reflective optical sensor 29 disposed at point A, stages the check for the various positions of the MICR print mechanism. In the home position 1, shown in FIG. 1, the cam 6 holds the printhead 16 away from the platen 30 by bearing against pin 15. Pressure pad 20 is also held away from the MICR read head 19 in the home position, as previously mentioned. Therefore, a check or other media can now be inserted into the print zone B of the check processing apparatus 10. Feed rollers 27 and 28, which are normally separated, are now clamped together to grip the inserted check, and feed it into the main printer unit for validation of account information on the check. The feed rollers 27 and 28 are rotated by a stepper motor (not shown). The check is driven back out (arrow 32), when the account validation operation is complete. The feed rollers 27 and 28 stop feeding the check, when the lead edge of the check is detected by the reflective optical sensor 29 at point A. The check is now positioned for printing (encoding), of the MICR characters in the amount field of the check.

Figure 2:
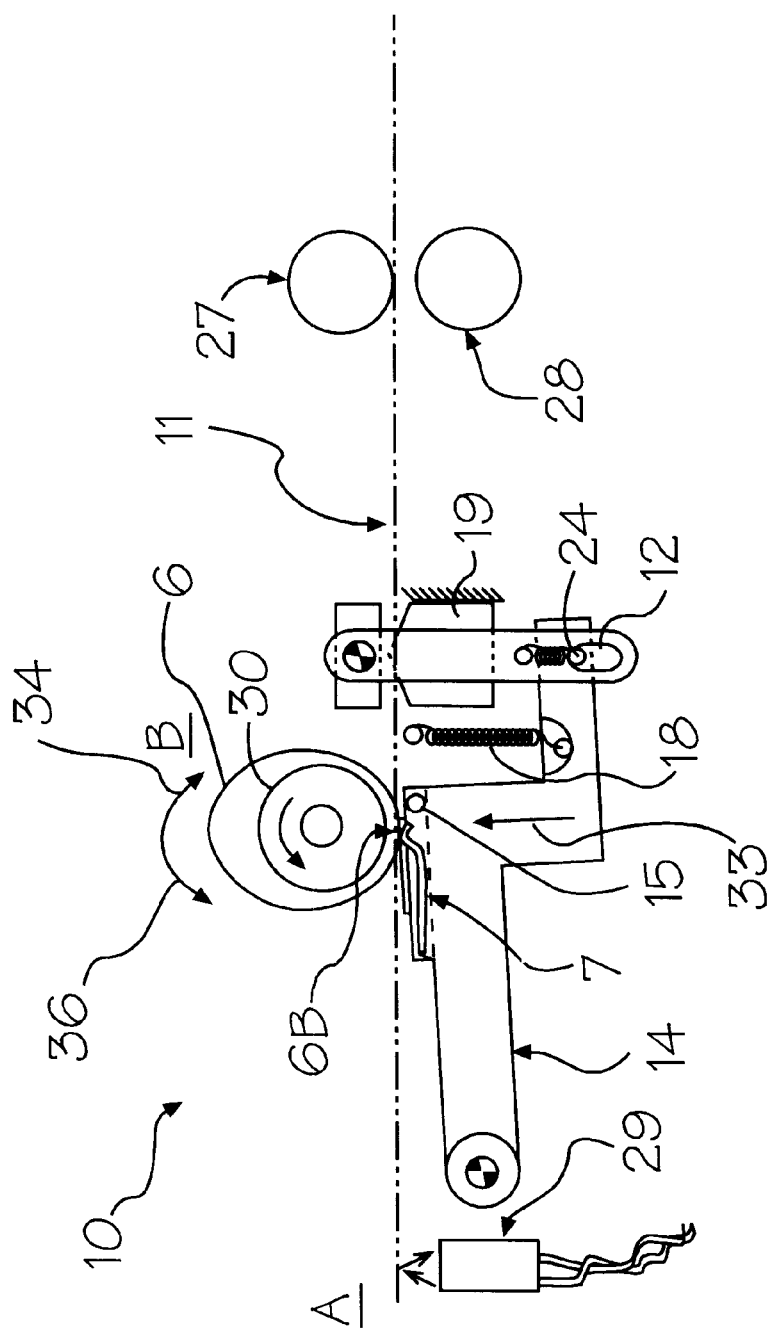
FIG. 2 depicts a schematic view of a check processing apparatus in a second check handling position corresponding to the MICR encoding of indicia thereupon.

Referring to FIG. 2, position 2 of the check processing apparatus 10, is illustrated. In this position, also known as the MICR encode position, cam 6 rotates clockwise (arrow 34), so that there is now clearance between the cam 6 and pin 15. This allows the printhead 16 to press a print ribbon (not shown), and the check against platen 30. A detent spring 7 engages in a suitable notch 6B in the cam, to hold the cam position. The cam 6 and platen 30 are both rotatively fixed upon the power input shaft 1. The cam 6, or platen 30 are selectively driven by the shaft 1, when the shaft 1 rotates either clockwise (arrow 34) to drive cam 6, or counter-clockwise (arrow 36, FIG. 2) to drive the platen 30. This is accomplished by a pawl clutch mechanism disposed within the cam 6. Shaft 1 is driven in the counter-clockwise direction 36, in order to drive the platen 30 in the same direction. The edge of the check is detected by the reflective optical sensor 29 at point A. This commands the control electronics of the check processing apparatus 10 to start energizing the heater elements on the printhead 16, which melts and transfers a wax-based ink from the ribbon to the check, thereby forming the MICR characters. It should be noted that feed rollers 27 and 28 are disengaged (opened), before platen 30 starts rotating. Pressure pad 20 and MICR read head 19 are also held apart.

Figure 3:
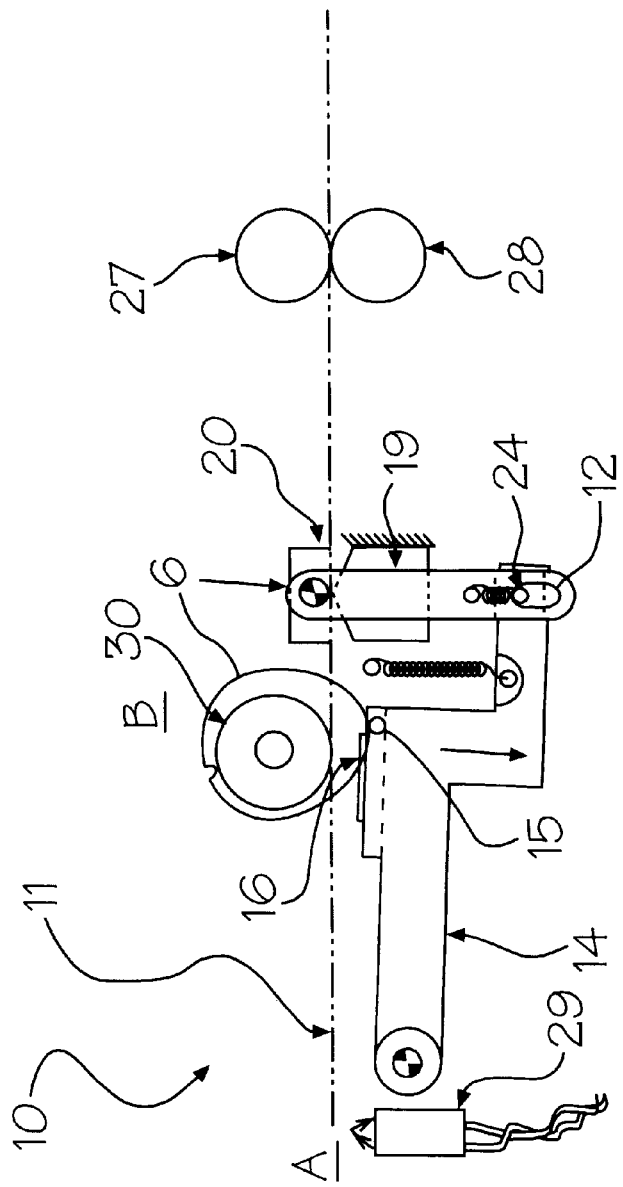
FIG. 3 shows a schematic view of a check processing apparatus in a third check handling position corresponding to reading of the imprinted MICR characters on the check.

Referring to FIG. 3, position three of apparatus 10, is shown. In this position, the MICR indicia printed upon the check are read. Feed rollers 27 and 28 are clamped together and grip the check, after the MICR indicia has been printed. Power input shaft 1 rotates clockwise and drives the cam 6 half-way to its high point. In this position, there is clearance between the printhead 16 and platen 30, and also between pressure pad 20 and the MICR read head 19. The check is then driven back out of the apparatus 10, where it is detected by the reflective optical sensor 29, which stops the feed rollers 27 and 28. Shaft 1 continues rotating clockwise and drives cam 6 to its high point against pin 15, and stops. This allows pressure pad 20 to contact and press the check against the MICR read head 19. Feed rollers 27 and 28, then drive the check past the MICR read head 19, which verifies the printed MICR characters. Cam 6 is then rotated clockwise back to position 1, so that there is again clearance between printhead 16 and platen 30, and pressure pad 20 and the MICR read head 19. Feed rollers 27 and 28 then drive the check back out of the check processing apparatus 10, and present it to the operator. Feed rollers 27 and 28 open to allow removal of the check. The mechanism is now back at the home position (FIG. 1), and is now ready for another point-of-sale transaction.

It can be observed that the optical sensor 29 plays a very important role in the processing of MICR imprinting and reading. The amount field must be precisely and accurately ascertained for both operations, and the sensing of the leading edge of the check precisely locates the amount field upon the check being processed. It then becomes an easy matter to advance the check by a stepper drive and print motor a fixed number of step increments in order to start the printing or read sequences.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

The present invention is particularly directed to use in a transaction printer which will employ varying features and functions, described in differing aspects, in any one or more of the following group of copending patent applications, all filed concurrently on Aug. 7, 1998: AXI-126 to Martinez et al for "COMPACT RIBBON CASSETTE", Ser. No. 09/130,598; pending AXI-139 to Martinez et al for "THERMAL TRANSFER MICR POINT-OF-SALE PRINTER", Ser. No. 09/131,109 U.S. Pat. No. 5,797,192; AXI-140 to Martinez for "RIBBON CASSETTE HAVING END OF RIBBON SENSING", Ser. No. 09/130,716 abandoned; AXI-140 to Rowlands for "POINT-OF-SALE MICR PRINTING AND READING", Ser. No. 09/130,811; AXI-143 to Turner for "RIBBON CASSETTE FOR IMPACT PRINTER", Ser. No. 09/130,699, U.S. Pat. No. 6,027,266; AXI-145 to Martinez et al for "COMPACT RIBBON CASSETTE WITH INTEGRAL FRICTION PLATE", Ser. No. 09/131,189 U.S. Pat. No. 6,048,118; AXI-146 to Martinez et al for "COMPACT RIBBON CASSETTE WITH MESHING GEAR POSITIVE DRIVE", Ser. No. 09/130,715 U.S. Pat. No. 6,019,528; AXI-147 to Martinez et al for "THERMAL TRANSFER MICR PRINTER", Ser. No. 09/131,110 U.S. Pat. No. 5,896,886; AXI-148 to Martinez et al for "THERMAL TRANSFER MICR PRINTER", Ser. No. 09/131,112 pending ; and AXI-149 to Walls et al for "CHECK PROCESSING", Ser. No. 09/131,111 pending .

Having thus described the invention, what is desired to be protected by Letters Patent is presented in the subsequently appended claims.

What is claimed is:

1. A transaction printer for encoding and reading MICR indicia upon said check at a point-of-sale, said transaction printer comprising:

means defining a check processing feed path;

drive means disposed along said check processing feed path for feeding said check along said feed path;

a MICR encoding and reading zone disposed along said feed path;

a check staging zone disposed along said feed path ahead of said MICR encoding and reading zone; and a sensing means disposed at said check staging zone for sensing a leading edge of said check, and in response thereto, generating a signal for controlling said drive means and the MICR encoding and reading of MICR indicia upon said check.

2. The transaction printer in accordance with claim 1, wherein said sensing means comprises a reflective optical sensor.

3. A transaction printer for encoding and reading MICR indicia upon said check at a point-of-sale, said transaction printer comprising:

means defining a check processing feed path;

drive means disposed along said check processing feed path for feeding said check along said feed path;

a check staging zone disposed along said feed path ahead for determining an amount field disposed upon said check; and a sensing means disposed at said check staging zone for sensing a leading edge of said check, and in response thereto, generating a signal for controlling said drive means and MICR encoding of MICR indicia upon said check in said amount field.

4. The transaction printer in accordance with claim 3, wherein said sensing means comprises a reflective optical sensor.

5. A method of processing a check at a point-of-sale, such that said check will be encoded with MICR indicia, the method comprising the steps of:

(a) presenting a check at a point-of-sale to a check processing machine having MICR encoding capability;

(b) driving said check along a MICR encoding feed path toward a staging point; and (c) sensing an edge of said check to precisely locate an amount field to be imprinted with MICR indicia.

6. The method in accordance with claim 5, wherein said sensing step (c) comprises sensing a leading edge of said check.

7. The method in accordance with claim 5, further comprising the steps of:

(d) sensing an edge of said check to precisely locate an amount field having been imprinted with MICR indicia; and (e) reading said amount field.

8. The method in accordance with claim 5, further comprising the step of:

(d) sensing said edge of said check to control the driving of said check in step (b).

* * * * *